(12) United States Patent
Kitamura

(10) Patent No.: US 12,342,753 B2
(45) Date of Patent: Jul. 1, 2025

(54) ROTATOR, BRUSH CUTTER, AND BOBBIN

(71) Applicant: KABUSHIKI KAISHA KITAMURA SEISAKUSHO, Mie (JP)

(72) Inventor: Kiyoshi Kitamura, Mie (JP)

(73) Assignee: KABUSHIKI KAISHA KITAMURA SEISAKUSHO, Mie (JP)

( * ) Notice: Subject to any disclaimer, the term of this patent is extended or adjusted under 35 U.S.C. 154(b) by 510 days.

(21) Appl. No.: 17/767,051

(22) PCT Filed: Oct. 8, 2019

(86) PCT No.: PCT/JP2019/039674
§ 371 (c)(1),
(2) Date: Apr. 7, 2022

(87) PCT Pub. No.: WO2021/070251
PCT Pub. Date: Apr. 15, 2021

(65) Prior Publication Data
US 2022/0361400 A1    Nov. 17, 2022

(51) Int. Cl.
*A01D 34/416*    (2006.01)
*A01D 34/67*    (2006.01)

(52) U.S. Cl.
CPC .......... *A01D 34/416* (2013.01); *A01D 34/67* (2013.01)

(58) Field of Classification Search
CPC .............................. A01D 34/416; A01D 34/67
USPC ......................................................... 30/276
See application file for complete search history.

(56) References Cited

U.S. PATENT DOCUMENTS

| | | | | |
|---|---|---|---|---|
| 4,091,538 A | * | 5/1978 | Akiyama | A01D 34/416 30/276 |
| 4,152,832 A | * | 5/1979 | Akaike | A01D 34/416 30/276 |
| 4,187,598 A | * | 2/1980 | Pittinger, Jr. | A01D 34/416 30/347 |
| 4,250,623 A | * | 2/1981 | Pittinger | A01D 34/416 30/347 |

(Continued)

FOREIGN PATENT DOCUMENTS

| | | |
|---|---|---|
| EP | 0640275 A2 | 3/1995 |
| JP | S6079923 U | 6/1985 |

(Continued)

OTHER PUBLICATIONS

International Search Report in PCT/JP2019/039674, mailed Dec. 24, 2019. 4pp.

(Continued)

*Primary Examiner* — Jason Daniel Prone
(74) *Attorney, Agent, or Firm* — HAUPTMAN HAM, LLP

(57) ABSTRACT

A rotator includes a supporting case and a bobbin. The supporting case includes a cylindrical portion, a flange portion extended from the cylindrical portion, and a plurality of extension holes provided through the flange portion. An inner peripheral surface of the bobbin is removably abutted onto an outer peripheral surface of the cylindrical portion. A string trimmer line with flexibility is wound around an outer peripheral surface of the bobbin. Both end portions of the string trimmer line wound around the outer peripheral surface of the bobbin are extended radially outward through two extension holes selected from a plurality of extension holes.

15 Claims, 11 Drawing Sheets

(56) References Cited

U.S. PATENT DOCUMENTS

| | | | | |
|---|---|---|---|---|
| 4,253,238 A | * | 3/1981 | Sheldon | A01D 34/416 30/276 |
| 4,271,595 A | * | 6/1981 | Rahe | A01D 34/416 30/347 |
| 4,356,686 A | * | 11/1982 | Lessig, III | A01D 34/416 30/347 |
| 4,476,632 A | * | 10/1984 | Proulx | A01D 34/416 30/276 |
| 4,580,394 A | * | 4/1986 | Baba | A01D 34/416 30/276 |
| 4,625,501 A | * | 12/1986 | Baba | A01D 34/416 30/276 |
| 4,640,084 A | * | 2/1987 | Baba | A01D 34/416 30/276 |
| 4,779,405 A | * | 10/1988 | Everts | A01D 34/416 30/276 |
| 4,805,306 A | * | 2/1989 | Baba | A01D 34/416 30/276 |
| 4,893,410 A | * | 1/1990 | Hoffmann | A01D 34/416 30/276 |
| 4,916,886 A | * | 4/1990 | Nakamura | A01D 34/416 30/276 |
| 5,095,688 A | * | 3/1992 | Fabrizio | A01D 34/4161 30/276 |
| 5,174,027 A | * | 12/1992 | Gusthalin | A01D 34/416 30/276 |
| 5,193,278 A | | 3/1993 | Osakabe et al. | |
| 5,276,968 A | * | 1/1994 | Collins | A01D 34/4162 30/276 |
| 5,311,665 A | * | 5/1994 | Sugihara | A01D 34/4162 30/276 |
| 5,433,006 A | * | 7/1995 | Taguchi | A01D 34/416 30/276 |
| 5,490,641 A | * | 2/1996 | Worthing | A01D 34/416 30/276 |
| 5,809,655 A | * | 9/1998 | Houben | A01D 34/416 30/276 |
| 5,836,227 A | * | 11/1998 | Dees, Jr. | A01D 34/416 30/276 |
| 6,754,964 B2 | * | 6/2004 | Sugihara | A01D 34/416 30/276 |
| 6,944,954 B1 | * | 9/2005 | Arnetoli | A01D 34/416 30/276 |
| 7,000,324 B2 | * | 2/2006 | Fogle | A01D 34/416 30/276 |
| 7,412,768 B2 | | 8/2008 | Alliss | |
| 7,581,322 B2 | * | 9/2009 | Proulx | A01D 34/416 30/276 |
| 8,341,847 B2 | * | 1/2013 | Kato | A01D 34/416 30/276 |
| 9,872,429 B2 | * | 1/2018 | Ma | A01D 34/416 |
| 10,225,981 B2 | * | 3/2019 | Kitamura | A01D 34/416 |
| 10,334,778 B2 | * | 7/2019 | Kullberg | A01D 34/416 |
| 2002/0170183 A1 | | 11/2002 | Sugihara et al. | |
| 2007/0180707 A1 | * | 8/2007 | Nystrom | A01D 34/416 30/347 |
| 2009/0260237 A1 | | 10/2009 | Alliss | |
| 2015/0150191 A1 | | 6/2015 | Alliss | |
| 2016/0219783 A1 | | 8/2016 | Kitamura | |

FOREIGN PATENT DOCUMENTS

| | | |
|---|---|---|
| JP | H252530 U | 4/1990 |
| JP | H5168328 A | 7/1993 |
| JP | 2002291315 A | 10/2002 |
| JP | 2006-014686 A | 1/2006 |
| JP | 2014236688 A | 12/2014 |
| JP | 2016538857 A | 12/2016 |
| WO | 2015037030 A1 | 3/2015 |
| WO | 2015077393 A1 | 5/2015 |

OTHER PUBLICATIONS

Extended European Search Report in EP Application No. 19948649.9, dated Sep. 23, 2022. 8pp.

Office Action in KR Application No. 10-2022-7015378, dated Oct. 25, 2024, 15pp.

* cited by examiner

ROTATOR, BRUSH CUTTER, AND BOBBIN

RELATED APPLICATIONS

The present application is a National Phase of International Application Number PCT/JP2019/039674, filed on Oct. 8, 2019.

TECHNICAL FIELD

The present disclosure relates to a rotator, a brush cutter, and a bobbin.

BACKGROUND ART

Grass trimming work has been carried out using a string trimmer line made of nylon, for example. To perform such grass trimming work, a rotator, to which the string trimmer line is attached, is coupled to a drive shaft of a brush cutter body, and is turned along with the drive shaft, thereby cutting surrounding grass with the tip portion of the string trimmer line extended radially outward from the rotator (see, for example, WO 2015/037030 A1).

In such a rotator, the tip portion of the string trimmer line will be gradually worn. Thus, when the string trimmer line is worn out, the string trimmer line needs to be removed from the rotator and a new string trimmer line needs to be attached as a replacement to the rotator.

SUMMARY OF INVENTION

An object of the present disclosure is to provide a rotator, a brush cutter, and a bobbin, each of which is designed to make the string trimmer line usable for a long term and to make the string trimmer line easily replaceable when it is time for replacement.

A rotator according to an aspect of the present disclosure includes a supporting case and a bobbin. The supporting case is coupled to a drive shaft of a brush cutter body and rotates along with the drive shaft. The bobbin is removably mounted onto the supporting case and rotates along with the drive shaft and the supporting case. The supporting case includes: a cylindrical portion, inside of which the drive shaft is inserted to pass therethrough; a flange portion extended radially outward from a lower part of the cylindrical portion; and a plurality of extension holes provided through the flange portion. The bobbin has: an inner peripheral surface to be removably abutted onto an outer peripheral surface of the cylindrical portion; and an outer peripheral surface which faces an opposite direction from the inner peripheral surface and around which a string trimmer line with flexibility is wound. The bobbin is configured to allow, in a state where the bobbin is mounted onto the cylindrical portion such that the inner peripheral surface of the bobbin is abutted onto the outer peripheral surface of the cylindrical portion, both end portions of the string trimmer line wound around the outer peripheral surface of the bobbin to be extended radially outward through two extension holes selected from the plurality of extension holes.

A brush cutter according to another aspect of the present disclosure includes: the rotator described above; and the brush cutter body having the drive shaft, to which the rotator is coupled.

A bobbin according to still another aspect of the present disclosure is removably attached to a rotator that rotates along with a drive shaft of a brush cutter body. The bobbin includes: a bobbin body having a cylindrical shape; an inner peripheral surface of the bobbin body; and an outer peripheral surface of the bobbin body. The inner peripheral surface of the bobbin body is provided to be removably abutted onto the rotator. The outer peripheral surface of the bobbin body faces an opposite direction from the inner peripheral surface of the bobbin body and is provided to have a string trimmer line with flexibility wound thereon.

DESCRIPTION OF EMBODIMENTS (Exemplary Embodiment)

The present disclosure will now be described by way of an exemplary embodiment illustrated on the accompanying drawings.

Figure 1:
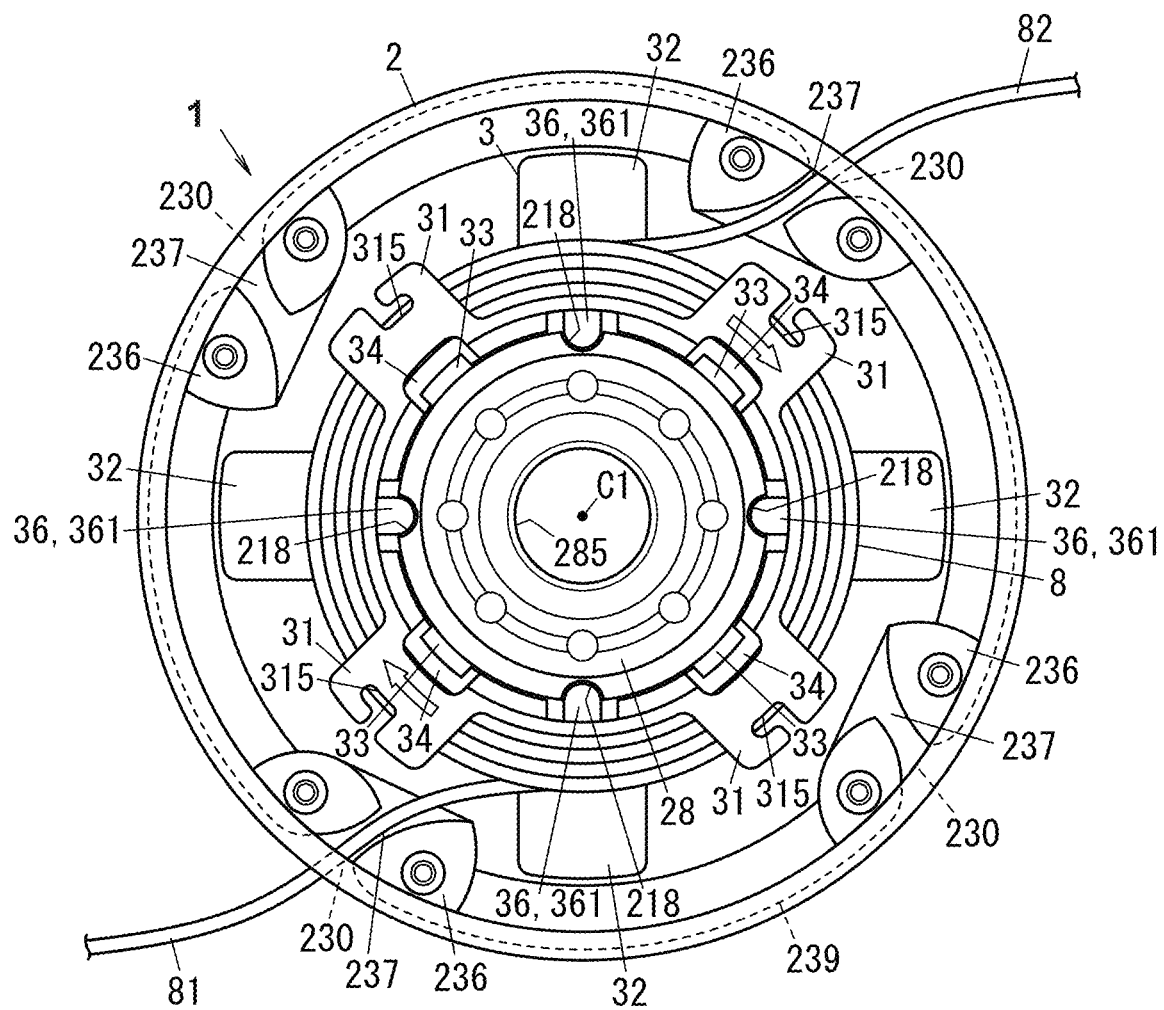
FIG. 1 is a top view of a rotator according to an exemplary embodiment, around which a string trimmer line is wound.
Figure 9:
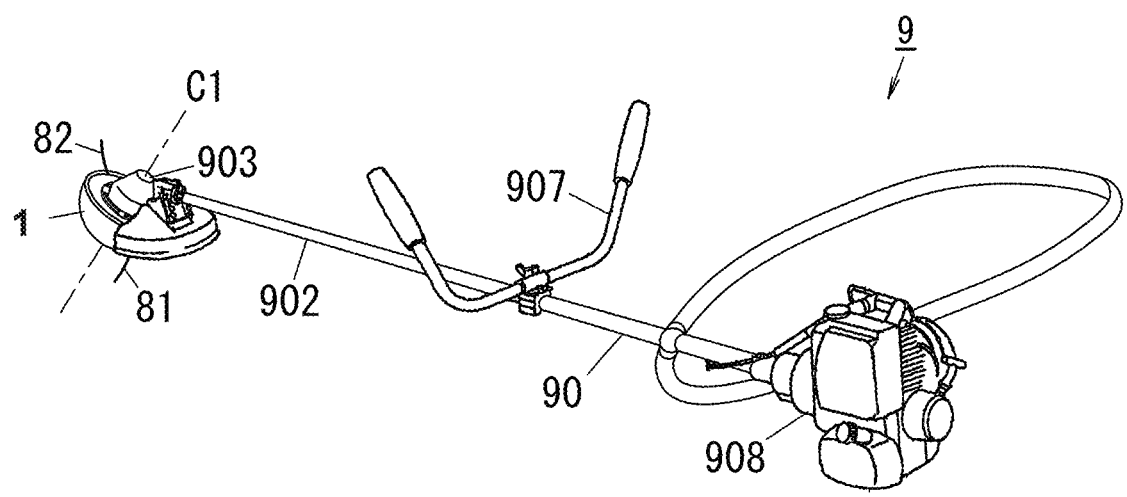
FIG. 9 is a perspective view of a brush cutter including the rotator.

FIG. 1 illustrates a rotator 1 according to an exemplary embodiment. A string trimmer line 8 is wound around the rotator 1. The rotator 1 is used for trimming grass in a state where the rotator 1 is attached to a brush cutter body 90 (see, for example, FIG. 9).

The rotator 1 according to this exemplary embodiment is a stabilizer 1 coupled to a drive shaft 905 (see FIG. 3) of the brush cutter body 90. A brush cutter 9 is made up of the brush cutter body 90 and the rotator 1 (i.e., the stabilizer 1).

The brush cutter body 90 includes a main shaft 902, a gearbox 903 provided at the tip portion of the main shaft 902, and the drive shaft 905 (see FIG. 3) protruding from the gearbox 903. A pair of handlebars 907 are provided in the middle of the main shaft 902. The main shaft 902 is equipped at the rear end with an engine 908 as a drive source. The engine 908 may be replaced with a battery as an alternative drive source.

Transmitting the output of the drive source (i.e., the engine 908) to the drive shaft 905 causes the rotator 1 to be driven in rotation along with the drive shaft 905. The rotator 1 may rotate with good stability while contacting the ground surface. Grass on the ground surface is trimmed with both end portions 81, 82 of the string trimmer line 8 made of a synthetic resin which is extended from an outer side surface of the rotator 1. The string trimmer line 8 may be a nylon string, for example. The surface of the string trimmer line 8 preferably has spiral surface unevenness.

Figure 2:
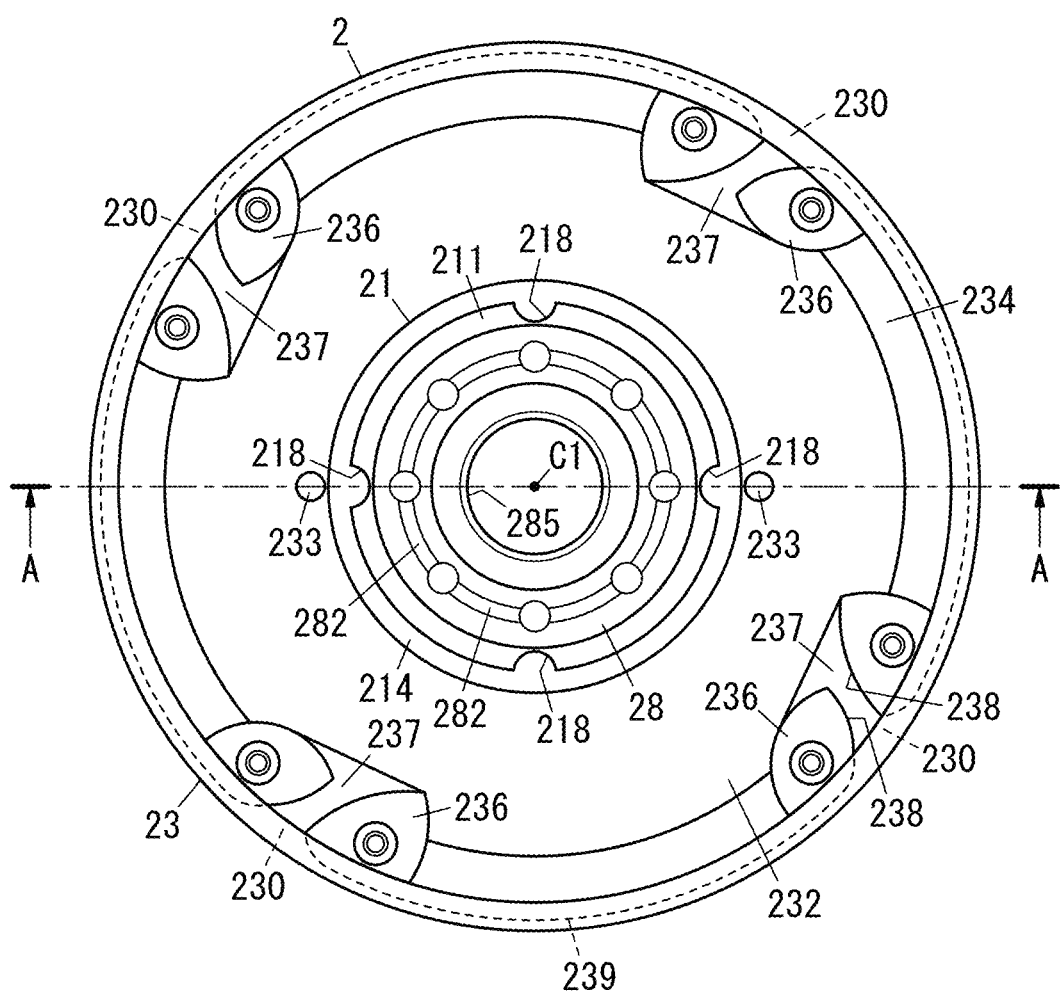
FIG. 2 is a top view of a supporting case included in the rotator.

The rotator 1 includes a supporting case 2 (see, for example, FIGS. 2 and 3) having a circular contour in plan view and a bobbin 3 (see, for example, FIGS. 4-8) having an annular contour in plan view. The string trimmer line 8 with flexibility is wound around the bobbin 3. The bobbin 3 is removably mounted from over the supporting case 2, which is open at the top, onto the supporting case 2. In other words, the bobbin 3 is a cartridge, around which the string trimmer line 8 is wound.

As used herein, the "plan view of the rotator 1" refers to a plan view of the rotator 1 as viewed from over the rotator 1. In this description, the respective directions such as the upward/downward direction are defined with respect to a reference situation where the rotator 1 is placed on the ground during actual use such that the center axis C1 (see, for example, FIGS. 3 and 9) of the rotator 1 extends in the vertical direction.

First, the supporting case 2 will be described in detail.

The supporting case 2 is coupled to the drive shaft 905 of the brush cutter body 90 and configured to rotate along with the drive shaft 905. The supporting case 2 includes: a cylindrical portion 21 having a cylindrical shape; a cuplike flange portion 23 extended radially outward from a lower part 212 of the cylindrical portion 21; and a metal fitting 28 coupled to an upper part 211 of the cylindrical portion 21. More specifically, the lower part 212 of the cylindrical portion 21 is a bottom part of the cylindrical portion 21. As used herein, the phrase "radially outside" and the phrase "radially inside," which is an antonym of the phrase "radially outside," are defined with respect to the center axis C1 of the rotator 1 as a reference axis. The center axis C1 of the rotator 1 is aligned with the center axis of the supporting case 2 and the center axis of the bobbin 3. Furthermore, in the following description, the circumferential and axial directions are defined with respect to the center axis C1 of the rotator 1 as a reference axis.

Next, the cylindrical portion 21, the flange portion 23, and the metal fitting 28 will be described in this order one by one.

The cylindrical portion 21 is a portion formed in a cylindrical shape as a molded product of a synthetic resin and has an inner peripheral surface 21A and an outer peripheral surface 21B. The inner peripheral surface 21A and the outer peripheral surface 21B are surfaces facing mutually opposite directions. The internal space of the cylindrical portion 21 is open downward. To the upper part 211 of the cylindrical portion 21, the metal fitting 28, having an annular shape in plan view, is firmly coupled by insert molding. More specifically, the upper part 211 of the cylindrical portion 21 is a top part of the cylindrical portion 21.

The outer peripheral surface 21B has an annular step portion 214, on which the bobbin 3 may be mounted, and a plurality of vertical grooves 218 which may guide the bobbin 3 that is going to be mounted onto, or removed from, the cylindrical portion 21.

The cylindrical portion 21 is divided, at the step portion 214, into an upper cylindrical part 213 and a lower cylindrical part 215 having a larger outside diameter than the upper cylindrical part 213. The outer peripheral surface of the upper cylindrical part 213 forms an upper part of the outer peripheral surface 21B of the cylindrical portion 21. The outer peripheral surface of the lower cylindrical part 215 forms a lower part of the outer peripheral surface 21B of the cylindrical portion 21. The plurality of vertical grooves 218 may be four vertical grooves 218 which are provided at intervals along the circumference of the outer peripheral surface of the upper cylindrical part 213. Each vertical groove 28 has an opening with a semicircular cross section.

The flange portion 23 is molded out of a synthetic resin material to be extended radially outward from the entire periphery of the lower part 212 of the cylindrical portion 21. The flange portion 23 is molded integrally with the cylindrical portion 21. The flange portion 23 is molded into a cuplike shape overall such that the flange portion 23 rises upward as the radial distance from the center axis of the flange portion 23 increases toward the outer periphery thereof.

The lower surface of the flange portion 23 is a ground contact surface 231 to make a sliding contact with the ground surface. The ground contact surface 231 is a smoothly curved, convex curvilinear surface. The surface 232, facing the opposite direction from the ground contact surface 231, of the flange portion 23 is a smoothly curved, concave curvilinear surface. The surface 232 has a plurality of recesses 233 to indicate the time to replace the supporting case 2. Each of the recesses 233 does not penetrate through the flange portion 23 but is configured to penetrate through the flange portion 23 when the flange portion 23 is worn to a certain degree.

The surface 232 of the flange portion 23 has a step portion 234, having an annular shape in plan view, in a vertically middle portion thereof. The upper surface of the step portion 234 is located above the step portion 214 of the cylindrical portion 21.

An upper part (specifically, a part located above the step portion 214) of the flange portion 23 has a plurality of extension holes 230 penetrating through the flange portion 23. The plurality of extension holes 230 may be four extension holes 230 arranged at intervals along the circumference of the flange portion 23. Each of the extension holes 230 radially penetrates through the flange portion 23 to allow the string trimmer line 8 to be inserted and passed therethrough.

On a part, located over the step portion 234, of the surface 232 of the flange portion 23, a plurality of guide members 236 are placed. The plurality of guide members 236 may be four guide members 236 placed radially inside of the four extension holes 230, respectively. Each of the guide members 236 has a guide groove 237 communicating with an associated one of the extension holes 230. Each guide groove 237 has a pair of guide surfaces 238, which are curved in a convex, curvilinear shape and are provided on both sides along the circumference of the flange portion 23. Each guide member 236 partially protrudes radially inward with respect to the step portion 234.

An upper part on the outer peripheral surface of the flange portion 23 has a groove 239, which is provided along the entire circumference of the flange portion 23. The bottom surface of the groove 239 has the respective openings of the four extension holes 230. The groove 239 is a part that guides the string trimmer line 8 to have the string trimmer line 8 stably wound around the outer peripheral surface of the flange portion 23 when the rotator 1 rotates at high velocities.

The metal fitting 28 is a member configured to have the drive shaft 905 of the brush cutter body 90 inserted and passed therethrough and be coupled to the drive shaft 905 via a fastening means. The metal fitting 28 has an insert hole 285, through which the drive shaft 905 is inserted and passed, as a center hole thereof, and a plurality of stepped through holes 286, which are provided at multiple points around the insert hole 285. The through holes 286 are provided through the upper surface of the metal fitting 28 and arranged at multiple points that are set at intervals along the circumference of the metal fitting 28. Filling the synthetic resin part of the cylindrical portion 21 into the respective through holes 286 allows the metal fitting 28 to be firmly coupled to the cylindrical portion 21.

Note that the means for coupling the cylindrical portion 21 and the metal fitting 28 to each other does not have to be insert molding. Rather, the cylindrical portion 21 and the metal fitting 28 only need to be coupled to each other to rotate along with each other and may also be coupled to each other by press fitting, screwing, or any other appropriate means.

The upper surface of the metal fitting 28 has an abutting rib 282, which is provided between each pair of through holes 286 that are adjacent to each other along the circumference of the metal fitting 28 and which is raised with respect to the rest of the upper surface of the metal fitting 28. These abutting ribs 282 stably abut on a receptacle fitting 906 (see FIG. 3) attached to the drive shaft 905.

The tip portion of the drive shaft 905 downwardly protrudes through the insert hole 285 of the metal fitting 28 and is housed inside the cylindrical portion 21. The part, housed inside the cylindrical portion 21, of the drive shaft 905 is fastened with a nut 909 from under the cylindrical portion 21. This allows the supporting case 2, and eventually the rotator 1 in its entirety, to be coupled to the drive shaft 905.

Next, the bobbin 3 will be described in detail.

The bobbin 3 is a member made of a synthetic resin, which is configured to rotate along with the drive shaft 905 and the supporting case 2 in a state where the bobbin 3 is mounted onto the supporting case 2. The bobbin 3 is a cylindrical member and has an inner peripheral surface 3A and an outer peripheral surface 3B, which face mutually opposite directions. The inner peripheral surface 3A is a concave curvilinear surface facing radially inward, while the outer peripheral surface 3B is a convex curvilinear surface facing radially outward.

The bobbin 3 includes a bobbin body 30 having a cylindrical shape, a plurality of projections 31 extended radially outward from an upper part 301 of the bobbin body 30, and a plurality of projections 32 extended radially outward from a lower part 303 of the bobbin body 30. In the following description, the plurality of projections 31 will be hereinafter referred to as "upper projections 31" and the plurality of projections 32 will be hereinafter referred to as "lower projections 32."

The inner peripheral surface of the bobbin body 30 is the inner peripheral surface 3A, which is configured to be removably abutted onto the outer peripheral surface 21B of the cylindrical portion 21.

The bobbin body 30 includes: a plurality of guide portions 36, which protrude radially inward; a plurality of elastic members 33, which are provided along the circumference of the bobbin body 30 separately from the guide portions 36; and a plurality of grooves 34, which are provided radially outside of these elastic members 33. The plurality of elastic members 33 are a plurality of projections made of a synthetic resin and having elasticity. The plurality of elastic members 33 are molded integrally with the rest of the bobbin body 30 other than the plurality of elastic members 33.

The plurality of guide portions 36 are a plurality of projections 361, which are configured to guide the bobbin 3 that is going to be mounted onto the cylindrical portion 21. The plurality of projections 361 may be four projections 361, which are arranged at intervals along the circumference of the bobbin body 30. The surface, facing radially inward, of each of the four projections 361 forms part of the inner peripheral surface 3A. The four projections 361 are formed to extend straight in the axis direction and are parallel to each other. Each projection 361 is formed to have a semicircular cross section to be axially slidably fitted into one vertical groove 218 selected from the four vertical grooves 218 of the cylindrical portion 21.

The plurality of elastic members 33 may be four elastic members 33, which are arranged at intervals along the circumference of the bobbin body 30. In the bobbin 3, the four elastic members 33 and the four projections 361 alternate with each other along the circumference of the bobbin body 30. Each elastic member 33 has a press surface 332 to be pressed and make elastic contact with the outer peripheral surface 21B of the cylindrical portion 21 in a state where the bobbin 3 is mounted onto the cylindrical portion 21. The press surface 332 of each elastic member 33 forms part of the inner peripheral surface 3A. In other words, parts of the inner peripheral surface 3A are configured to be pressed and make elastic contact with the outer peripheral surface 21B of the cylindrical portion 21.

Figure 7:
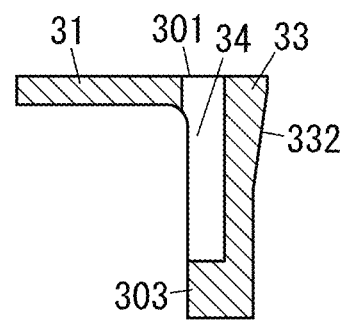
FIG. 7 is a cross-sectional view thereof taken along the plane B-B shown in FIG. 6.
Figure 8:
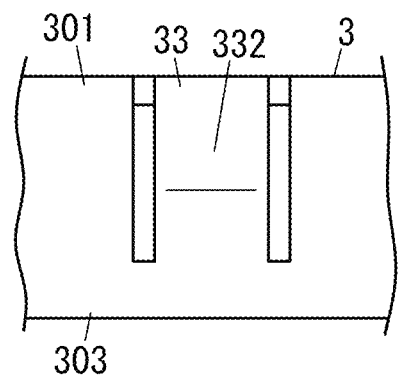
FIG. 8 is a view as viewed in the direction indicated by the arrow C shown in FIG. 6.

Each elastic member 33 is a projection in the shape of a protruding piece, which is formed to stand upright and upward (see FIG. 7). In a state where the bobbin 3 is not mounted onto the cylindrical portion 21 yet, part (specifically, an upper part) of each elastic member 33 protrudes radially inward with respect to the rest of the elastic member 33. The surface of that part facing radially inward is the press surface 332 to be pressed and make elastic contact with the outer peripheral surface 21B. The press surface 332 is tilted obliquely upward such that the top portion of the press surface 332 protrudes radially inward most significantly.

The plurality of grooves 34 may be four grooves 34, which are arranged at intervals along the circumference of the bobbin body 30. Each of the four grooves 34 is located radially outside of an associated elastic member 33 out of the four elastic members 33 and allows the associated elastic member 33 to be flexed radially outward. Providing the groove 34 radially outside of each elastic member 33 allows the elastic member 33 to be flexed radially outward.

The outer peripheral surface of the bobbin body 30 is the outer peripheral surface 3B which is configured to allow the flexible string trimmer line 8 to be wound thereon. In plan view (in other words, when viewed along the center axis C1), the plurality of upper projections 31 and the plurality of lower projections 32 alternate with each other along the circumference of the bobbin body 30.

The plurality of upper projections 31 may be four upper projections 31, which are arranged at intervals along the circumference of the bobbin body 30. In this embodiment, each of the four upper projections 31 is a protruding piece with a rectangular flat plate shape. However, this is only an example and should not be construed as limiting. Alternatively, the plurality of upper projections 31 may also have any other shape.

A radially outer end portion of each of the four upper projections 31 has a hook groove 315. The hook groove 315 has a shape that is cut out in an L-shape from the radially outer end portion of the upper projection 31. The hook groove 315 is configured to hook thereon one of the two end portions 81, 82 of the string trimmer line 8. Note that the hook grooves 315 may be provided through at least two upper projections 31 out of the four upper projections 31.

Figure 6:
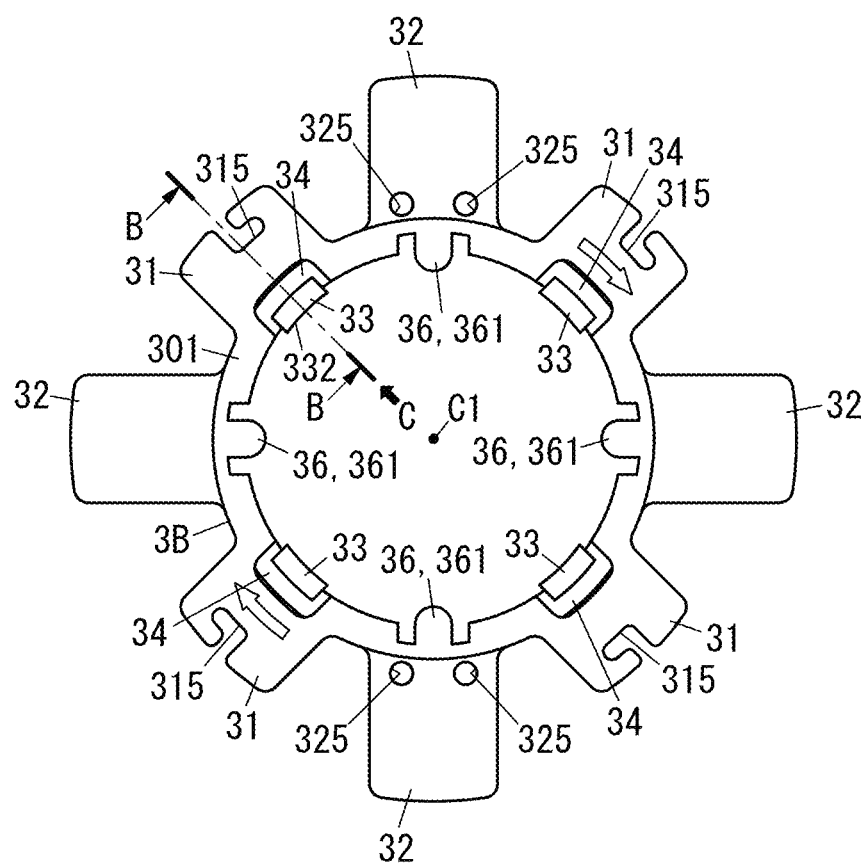
FIG. 6 is a top view of the bobbin.

As shown in FIG. 6 and other drawings, the elastic member 33 and the groove 34 are located radially inside of each of the four upper projections 31. In other words, each elastic member 33 and its associated groove 34 allowing the elastic member 33 to be flexed are provided inside an associated upper projection 31 out of the four upper projections 31. In the rotor 1 according to this exemplary embodiment, the elastic member 33 and groove 34 are provided radially inside of each and every one of the four upper projections 31. However, this is only an example and should not be construed as limiting. Rather, the elastic member 33 and the groove 34 may be provided radially inside of at least one upper projection 31 out of the four upper projections 31.

The plurality of lower projections 32 may be four lower projections 32, which are arranged at intervals along the circumference of the bobbin body 30. In this embodiment, each of the four lower projections 32 is a protruding piece with a rectangular flat plate shape. However, this is only an example and should not be construed as limiting. Alternatively, the plurality of lower projections 32 may also have any other shape.

Two lower projections 32 out of the four lower projections 32 each have a pair of hook holes 325. The pair of hook holes 325 are a pair of round holes, which are provided through a radially inner end portion of the lower projection 32. The pair of hook holes 325 are arranged side by side along the circumference of the bobbin body 30. The pair of hook holes 325 are configured to allow the string trimmer line 8 to be inserted and passed therethrough and to hook a middle portion 85 thereof. Note that the pair of hook holes 325 may be provided through at least one lower projection 32 out of the four lower projections 32.

Figure 4:
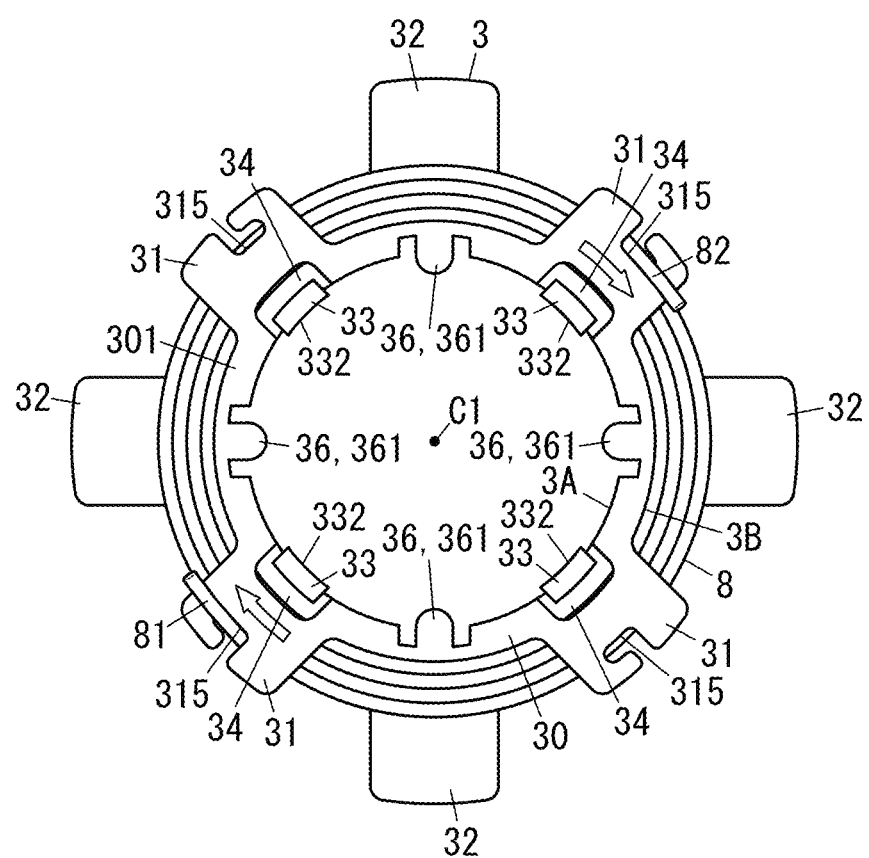
FIG. 4 is a top view of a bobbin, around which a string trimmer line is wound and which is a constituent element of the rotator.
Figure 5:
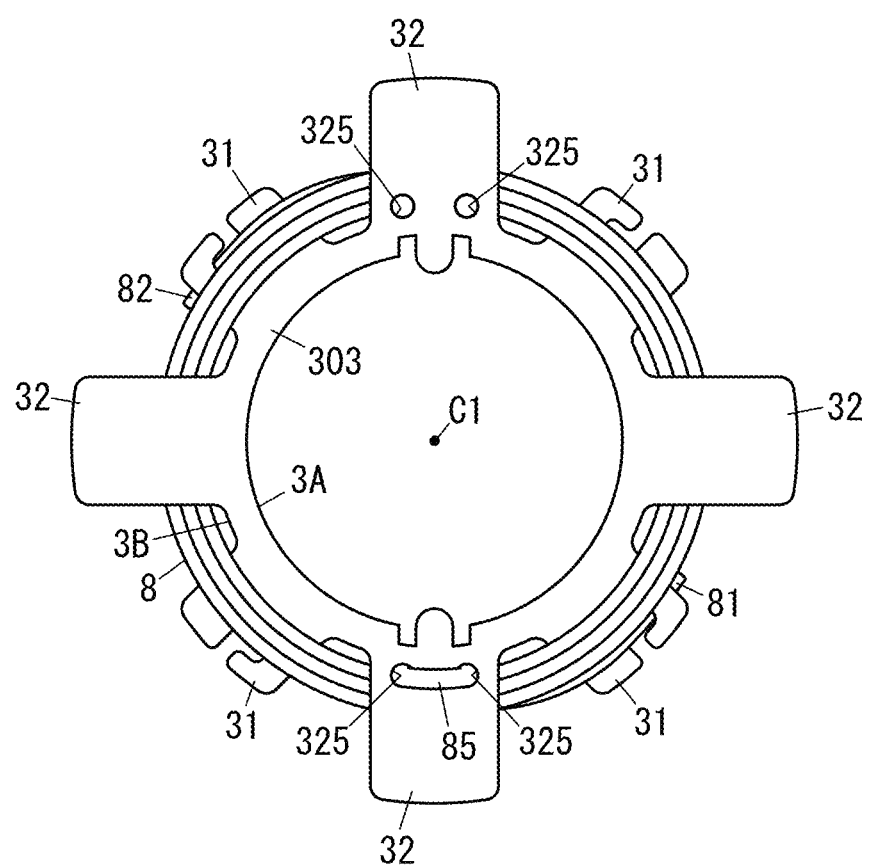
FIG. 5 is a bottom view of the bobbin, around which the string trimmer line is wound.

In the rotor 1 according to the exemplary embodiment described above, the bobbin 3 yet to be mounted onto the supporting case 2 is provided in the state shown in FIGS. 4 and 5. That is to say, in the bobbin 3 yet to be mounted, the middle portion 85 of the string trimmer line 8 is hooked on the pair of hook holes 325 and the rest of the string trimmer line 8 other than the middle portion 85 is wound multifold around the outer peripheral surface 3B of the bobbin 3. The direction in which the string trimmer line 8 is wound may be indicated by, for example, an arrow mark on the upper surface of at least one of the four upper projections 31. In this embodiment, the arrow mark is provided on the upper surface of each of two upper projections 31 which are radially opposed to each other with respect to the center axis C1. In addition, both end portions 81, 82 of the string trimmer line 8 are respectively hooked on the hook grooves 315 of the two upper projections 31 which are radially opposed to each other with respect to the center axis C1.

When the bobbin 3 is inserted onto the cylindrical portion 21 of the supporting case 2 from over the cylindrical portion 21, each of the plurality of elastic members 33, which are arranged at intervals along the circumference of the bobbin 3, is elastically pressed radially outward while making sliding contact with the outer peripheral surface 21B of the cylindrical portion 21. This allows, in a state where the bobbin 3 is mounted onto the supporting case 2, the bobbin 3 to be stably held by the supporting case 2 with the frictional force produced between the plurality of elastic members 33 and the cylindrical portion 21. In other words, the respective elastic members 33 which are elastically pressed against the outer peripheral surface 21B of the cylindrical portion 21 produce biasing force for having the bobbin 3 held by the supporting case 2.

In the state where the bobbin 3 is mounted onto the supporting case 2, both end portions 81, 82 of the string trimmer line 8 are respectively disengaged from the hook grooves 315. Thereafter, the end portions 81, 82 of the string trimmer line 8 are respectively extended outward to an appropriate length through their associated extension holes 230. This allows the two end portions 81, 82 of the string trimmer line 8, which is wound multifold around the outer peripheral surface 3B of the bobbin 3, to be extended radially outward through two extension holes 230 out of the four extension holes 230.

Figure 3:
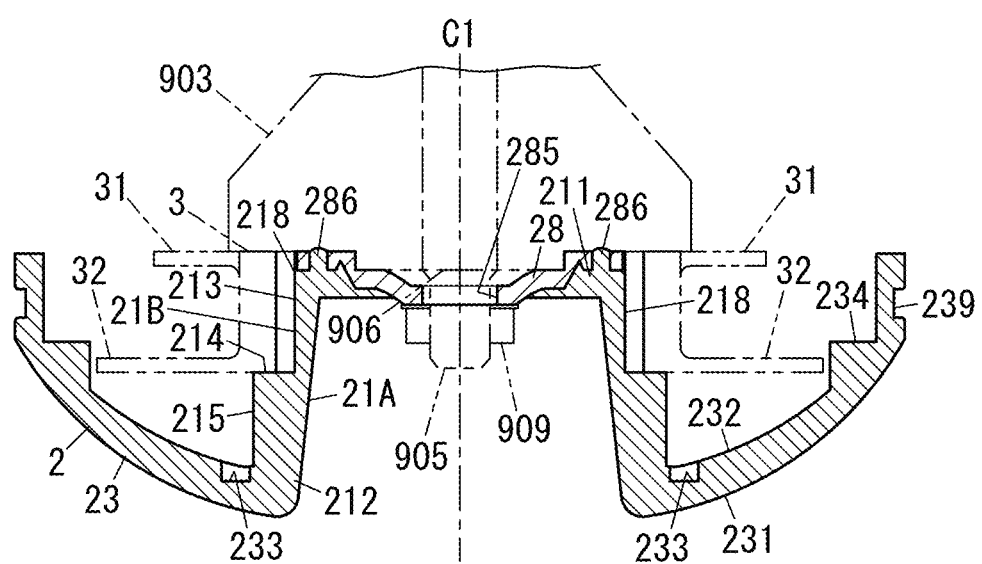
FIG. 3 is a cross-sectional view showing an upright position of the supporting case taken along the plane A-A shown in FIG. 2.

In this state, the drive shaft 905 of the brush cutter body 90 is inserted through the insert hole 285 of the metal fitting 28 into the space inside the cylindrical portion 21. Then, inside the cylindrical portion 21, the nut 909 is fastened with respect to the drive shaft 905, thereby firmly coupling the drive shaft 905 to the supporting case 2 to each other. As shown in FIG. 3, the gearbox 903 of the brush cutter body 90 is located to cover a radially inner portion of the bobbin 3 (specifically, at least a part of the bobbin body 30) from over the bobbin 3. This may reduce the chances of the bobbin 3 coming off accidentally during the trimming work.

The rotor 1 according to the exemplary embodiment described above allows, when the part, extended out of one of the extension holes 230, of the string trimmer line 8 becomes shorter due to wear, that part may be extended out of another one of the extension holes 230. This makes the single string trimmer line 8, wound around the bobbin 3, usable for a long term without replacing the bobbin 3 itself.

In addition, the rotor 1 according to this exemplary embodiment may also make it easier to replace the bobbin 3, including the string trimmer line 8, in its entirety when it is time to replace the bobbin 3. Specifically, to replace the bobbin 3, the user may loosen and remove the nut 909 from the drive shaft 905, pull the drive shaft 905 out of the supporting case 2, and then grip the bobbin 3 with his or her hand. In this manner, the user may remove the bobbin 3 easily from the supporting case 2. At this time, the user is allowed to hold the bobbin body 30, as well as the string trimmer line 8 wound around the bobbin body 30, by inserting his or her fingers into the space between adjacent ones of the plurality of upper projections 31. Next, the user may easily mount another bobbin 3, around which another string trimmer line 8 is wound, onto the supporting case 2.

During the replacement, the bobbin 3 may be held stably, irrespective of the orientation of the supporting case 2 (e.g., even if the supporting case 2 is put upside down), with respect to the supporting case 2 with the elastic holding force applied by the plurality of elastic members 33. This may reduce the chances of the bobbin 3 falling off accidentally from the supporting case 2. In addition, this also makes it easier to remove the bobbin 3 from the supporting case 2.

Figure 10:
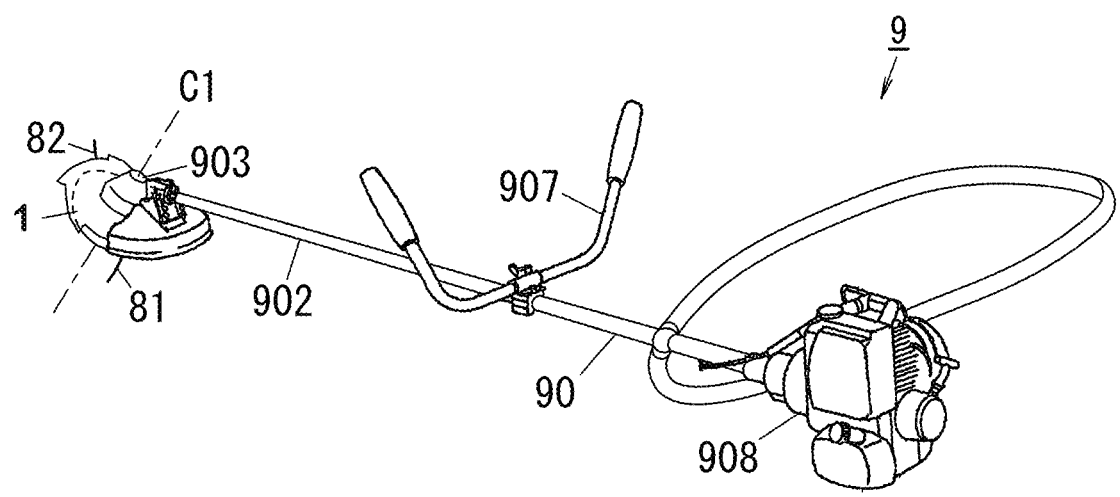
FIG. 10 is a perspective view of a brush cutter including the rotator and a rotary blade.

In the exemplary embodiment described above, the rotator 1 is directly coupled to the drive shaft 905. However, this is only an example and should not be construed as limiting. Alternatively, the rotary blade 5 may also be sandwiched between the rotator 1 and the drive shaft 905 (see FIG. 10). In that case, the rotary blade 5 is sandwiched between the receptacle fitting 906 attached to the drive shaft 905 and the metal fitting 28 of the supporting case 2. Turning the drive shaft 905 in this state to cause the rotator 1 and the rotary blade 5 to rotate along with each other allows grass trimming work to be done by both the string trimmer line 8 and the rotary blade 5 in parallel with each other.

(Variations)

Although the present disclosure has been described by way of the exemplary embodiment illustrated on the drawings, the embodiment described above is only an exemplary one of various embodiments of the present disclosure and should not be construed as limiting.

Figure 11:
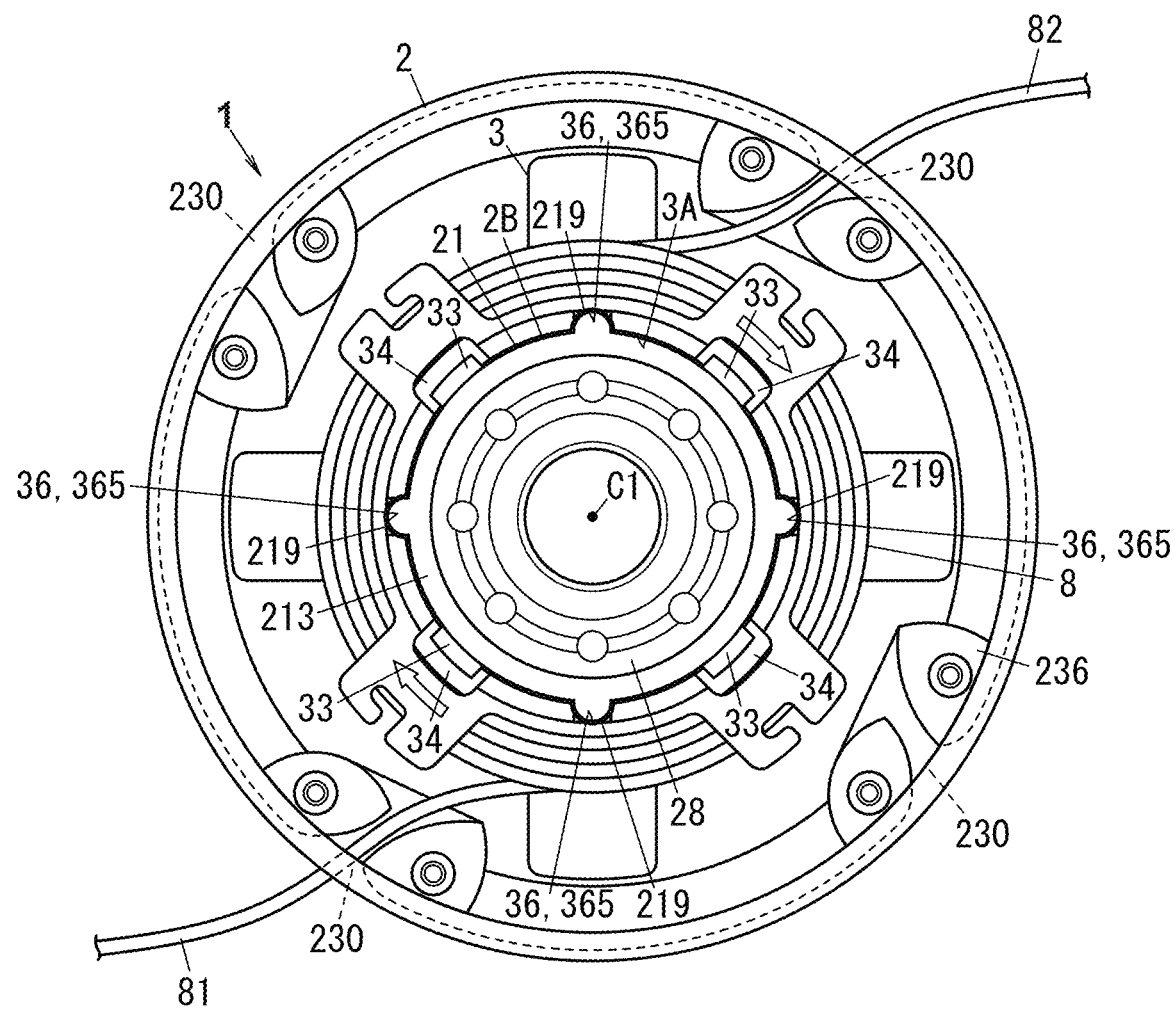
FIG. 11 is a top view of a rotator according to a variation, around which the string trimmer line is wound.

For example, as in the variation illustrated in FIG. 11, the plurality of guide portions 36 of the bobbin 3 may also be formed as recesses instead of the projections. In this variation, the plurality of guide portions 36 are a plurality of vertical grooves 365, which are configured to guide the bobbin 3 that is going to be mounted onto the cylindrical portion 21. The plurality of vertical grooves 365 may be four vertical grooves 365 which are arranged at intervals along the circumference of the bobbin body 30. Each of the plurality of vertical grooves 365 forms part of the inner peripheral surface 3A. The four vertical grooves 365 are formed to extend straight in the axis direction and are parallel to each other.

In this variation, the outer peripheral surface 21B of the cylindrical portion 21 has a plurality of projections 219, which are configured to guide the bobbin 3 that is going to be mounted onto, and removed from, the cylindrical portion 21. The plurality of projections 219 may be four projections 219, which are provided on the outer peripheral surface of the upper cylindrical part 213 and arranged at intervals along the circumference of the cylindrical portion 21. Letting each projection 219 be axially slidably fitted into one vertical groove 365 selected from the four vertical grooves 365 enables guiding the bobbin 3 that is going to be mounted onto the cylindrical portion 21.

Any other constituent element may also be readily modified as appropriate depending on a design choice or any other factor without departing from the scope of the present disclosure. For example, the materials mentioned above for the respective constituent elements are only examples. Specifically, the bobbin 3 may also be made of paper or any suitable material other than resin. The supporting case 2 may also be made of a metal or any suitable material other than resin. The metal fitting 28 may be omitted from the supporting case 2. Optionally, the supporting case 2 may also be used out of contact with the ground surface.

(Implementations)

As can be seen from the foregoing description of embodiments, a first implementation of a rotator (1) has the following configuration. Specifically, the first implementation of the rotator (1) includes: a supporting case (2) which is coupled to a drive shaft (905) of a brush cutter body (90) and which rotates along with the drive shaft (905); and a bobbin (3) which is removably mounted onto the supporting case (2) and which rotates along with the drive shaft (905) and the supporting case (2). The supporting case (2) includes: a cylindrical portion (21), inside of which the drive shaft (905) is inserted to pass therethrough; a flange portion (23) extended radially outward from a lower part (212) of the cylindrical portion (21); and a plurality of extension holes (230) provided through the flange portion (23). The bobbin (3) has: an inner peripheral surface (3A) to be removably abutted onto an outer peripheral surface (21B) of the cylindrical portion (21); and an outer peripheral surface (3B) which faces an opposite direction from the inner peripheral surface (3A) and around which a string trimmer line (8) with flexibility is wound. The bobbin (3) is configured to allow, in a state where the bobbin (3) is mounted onto the cylindrical portion (21) such that the inner peripheral surface (3A) of the bobbin (3) is abutted onto the outer peripheral surface (21B) of the cylindrical portion (21), both end portions (81, 82) of the string trimmer line (8) wound around the outer peripheral surface (3B) of the bobbin (3) to be extended radially outward through two extension holes (230) selected from the plurality of extension holes (230).

The rotator (1) according to the first implementation enables making the string trimmer line (8) wound around the bobbin (3) usable for a long term, while appropriately changing two extension holes (230), through which the end portions (81, 82) of the string trimmer line (8) are extended, selected from the plurality of extension holes (230). In addition, when it is time to replace the string trimmer line (8), the bobbin (3), including the string trimmer line (8), may be easily removed in its entirety from the supporting case (2), thus making the string trimmer line (8) easily replaceable.

A second implementation of the rotator (1) has not only the configuration of the rotator (1) according to the first implementation but also the following configuration as well. In the second implementation of the rotator (1), the bobbin (3) further includes at least one elastic member (33) configured to, in the state where the bobbin (3) is mounted onto the cylindrical portion (21), be pressed and make elastic contact with the outer peripheral surface (21B) of the cylindrical portion (21).

The rotator (1) according to the second implementation allows, irrespective of the orientation of the supporting case (2), the bobbin (3) to be held stably with respect to the supporting case (2) with the elastic holding force applied by the at least one elastic members (33). This may reduce the chances of the bobbin (3) falling off accidentally from the supporting case (2). In addition, this also makes it easier to remove the bobbin (3) from the supporting case (2).

A third implementation of the rotator (1) has not only the configuration of the rotator (1) according to the second implementation but also the following configuration as well. In the third implementation of the rotator (1), the bobbin (3) further has a groove (34) that allows the at least one elastic member (33) to be flexed radially outward.

The rotator (1) according to the third implementation allows the elastic member (33) to be flexed radially outward while being abutted onto the outer peripheral surface (21B) of the cylindrical portion (21). Thus, the elastic member (33) may apply moderate elastic force to the cylindrical portion (21).

A fourth implementation of the rotator (1) has not only the configuration of the rotator (1) according to the second implementation but also the following configuration as well. In the fourth implementation of the rotator (1), the at least one elastic member (33) of the bobbin (3) includes a plurality of elastic members (33) arranged at intervals along a circumference of the bobbin (3).

The rotator (1) according to the fourth implementation brings the plurality of elastic members (33) into contact with the outer peripheral surface (21B) of the cylindrical portion (21) at multiple points that are set thereon at intervals along the circumference thereof, thus allowing the bobbin (3) to be held stably with respect to the supporting case (2).

A fifth implementation of the rotator (1) has not only the configuration of the rotator (1) according to the fourth implementation but also the following configuration as well. In the fifth implementation of the rotator (1), the bobbin (3) further has a plurality of grooves (34) that allow the plurality of elastic members (33) to be respectively flexed radially outward.

The rotator (1) according to the fifth implementation allows each of the plurality of elastic members (33) to be flexed radially outward while being abutted onto the outer peripheral surface (21B) of the cylindrical portion (21). Thus, the plurality of elastic members (33) may apply moderate elastic force to the cylindrical portion (21).

A sixth implementation of the rotator (1) has not only the configuration of the rotator (1) according to any one of the first to fifth implementations but also the following configuration as well. In the sixth implementation of the rotator (1), the inner peripheral surface (3A) of the bobbin (3) has a plurality of guide portions (36) which are either raised or recessed to guide the bobbin (3) that is going to be mounted onto the cylindrical portion (21).

The rotator (1) according to the sixth implementation makes it easier to mount the bobbin (3) onto the cylindrical portion (21). In addition, when the bobbin (3) is mounted onto the cylindrical portion (21), the plurality of guide portions (36) are hooked on the outer peripheral surface (21B) of the cylindrical portion (21), thereby having the bobbin (3) positioned circumferentially with respect to the cylindrical portion (21).

A seventh implementation of the rotator (1) has not only the configuration of the rotator (1) according to the fourth or fifth implementation but also the following configuration as well. In the seventh implementation of the rotator (1), the inner peripheral surface (3A) of the bobbin (3) has a plurality of guide portions (36) which are either raised or recessed to guide the bobbin (3) that is going to be mounted onto the cylindrical portion (21). The plurality of elastic members (33) and the plurality of guide portions (36) are alternately arranged along the circumference of the bobbin (3).

The rotator (1) according to the seventh implementation makes it easier to mount the bobbin (3) onto the cylindrical portion (21). In addition, when the bobbin (3) is mounted onto the cylindrical portion (21), the plurality of guide portions (36) are hooked on the outer peripheral surface (21B) of the cylindrical portion (21), thereby having the bobbin (3) positioned circumferentially with respect to the cylindrical portion (21). Besides, this also enables arranging the plurality of elastic members (33) and the plurality of guide portions (36) efficiently on the bobbin (3).

An eighth implementation of the rotator (1) has not only the configuration of the rotator (1) according to any one of the first to seventh implementations but also the following configuration as well. In the eighth implementation of the rotator (1), the bobbin (3) further includes: a bobbin body (30) having a cylindrical shape and having the inner peripheral surface (3A) and the outer peripheral surface (3B); a plurality of upper projections (31) extended radially outward from an upper part (301) of the bobbin body (30); and a plurality of lower projections (32) extended radially outward from a lower part (303) of the bobbin body (30).

The rotator (1) according to the eighth implementation allows the plurality of upper projections (31) and the plurality of lower projections (32) to effectively prevent the string trimmer line (8) wound around the outer peripheral surface (3A) of the bobbin body (30) from coming off accidentally from the bobbin body (30). In addition, this also allows the user, who is going to grip the bobbin (3), to hold the bobbin body (30) along with the string trimmer line (8) wound thereon by inserting his or her fingers into either the space between the plurality of upper projections (31) or the space between the plurality of lower projections (32).

A ninth implementation of the rotator (1) has not only the configuration of the rotator (1) according to the eighth implementation but also the following configuration as well. In the ninth implementation of the rotator (1), the plurality of upper projections (31) and the plurality of lower projections (32) are alternately arranged along the circumference of the bobbin (3) when viewed along a center axis (C1) of the bobbin (3).

The rotator (1) according to the ninth implementation allows the plurality of upper projections (31) and the plurality of lower projections (32), which are alternately arranged along the circumference of the bobbin (3), to effectively prevent the string trimmer line (8) wound around the outer peripheral surface (3A) of the bobbin body (30) from coming off accidentally from the bobbin body (30). In addition, this configuration may also reduce the number of the upper projections (31) to provide and the number of the lower projections (32) to provide.

A tenth implementation of the rotator (1) has not only the configuration of the rotator (1) according to any one of the first to seventh implementations but also the following configuration as well. In the tenth implementation of the rotator (1), the bobbin (3) further includes: a bobbin body (30) having a cylindrical shape and having the inner peripheral surface (3A) and the outer peripheral surface (3B); and a plurality of upper projections (31) extended radially outward from an upper part (301) of the bobbin body (30). At least two upper projections (31) selected from the plurality of upper projections (31) are each provided with a hook groove (315) to hook an end portion (81, 82) of the string trimmer line (8).

The rotator (1) according to the tenth implementation allows the plurality of upper projections (31) to effectively prevent the string trimmer line (8) wound around the outer peripheral surface (3A) of the bobbin body (30) from coming off accidentally from the bobbin body (30). In addition, this also allows the user, who is going to grip the bobbin (3), to hold the bobbin body (30) along with the string trimmer line (8) wound thereon by inserting his or her fingers into the space between the plurality of upper projections (31). Furthermore, the rotator (1) according to the tenth implementation allows, in a state where the bobbin (3) is not mounted onto the supporting case (2) yet, both end portions (81, 82) of the string trimmer line (8) to be respectively hooked on the hook grooves (315), thus preventing the string trimmer line (8) from easily coming off the supporting case (2).

An eleventh implementation of the rotator (1) has not only the configuration of the rotator (1) according to any one of the first to seventh implementations but also the following configuration as well. In the eleventh implementation of the rotator (1), the bobbin (3) further includes: a bobbin body (30) having a cylindrical shape and having the inner peripheral surface (3A) and the outer peripheral surface (3B); and a plurality of lower projections (32) extended radially outward from a lower part (303) of the bobbin body (30). At least one lower projection (32) selected from the plurality of lower projections (32) has a hook hole (325), into which the string trimmer line (8) is inserted to pass therethrough such that a middle portion of the string trimmer line (8) is hooked on the hook hole (325).

The rotator (1) according to the eleventh implementation allows the user to wind a single string trimmer line (8) around the bobbin body (30) easily by hooking the middle portion (85) of the string trimmer line (8) on the hook hole (325) and winding the rest of the string trimmer line (8) around the bobbin body (30).

A twelfth implementation of the rotator (1) has not only the configuration of the rotator (1) according to any one of the first to eleventh implementations but also the following configuration as well. In the twelfth implementation of the rotator (1), the cylindrical portion (21) and the flange portion (23) of the supporting case (2) are both made of a synthetic resin. The supporting case (2) further includes a metal fitting (28) to be coupled to an upper part (211) of the cylindrical portion (21). The metal fitting (28) has an insert hole (285), into which the drive shaft (905) is inserted to pass therethrough.

The rotator (1) according to the twelfth implementation allows the cylindrical portion (21) and the flange portion (23), both of which are made of a synthetic resin, to be coupled together to the drive shaft (905) via the metal fitting (28).

A thirteenth implementation of the rotator (1) has not only the configuration of the rotator (1) according to the first implementation but also the following configuration as well. In the thirteenth implementation of the rotator (1), the bobbin (3) further includes: a bobbin body (30) having a cylindrical shape and having the inner peripheral surface (3A) and the outer peripheral surface (3B); a plurality of projections (31) extended radially outward from the bobbin body (30); an elastic member (33) configured to, in the state where the bobbin body (30) is mounted onto the cylindrical portion (21), be pressed and make elastic contact with the outer peripheral surface (21B) of the cylindrical portion (21); and a groove (34) that allows the elastic member (33) to be flexed radially outward. The elastic member (33) and the groove (34) are located radially inside of an associated projection (31) out of the plurality of projections (31).

The rotator (1) according to the thirteenth implementation allows the plurality of projections (31) to effectively prevent the string trimmer line (8) wound around the outer peripheral surface (3A) of the bobbin body (30) from coming off accidentally from the bobbin body (30). In addition, the rotator (1) according to the thirteenth implementation also allows the elastic member (33) to be flexed radially outward while being abutted onto the outer peripheral surface (21B) of the cylindrical portion (21). Thus, the elastic member (33) may apply moderate elastic force to the cylindrical portion (21). Furthermore, the rotator (1) according to the thirteenth implementation also allows the overall size of the bobbin (3) to be reduced by providing the elastic member (33) and the groove (34) radially inside of their associated projection (31).

A first implementation of a brush cutter (9) includes: the rotator (1) according to any one of the first to thirteenth implementations; and the brush cutter body (90) having the drive shaft (905), to which the rotator (1) is coupled.

The brush cutter (9) according to the first implementation enables making the string trimmer line (8) wound around the cylindrical portion (21) of the supporting case (2) of the rotator (1) usable for a long term. In addition, when it is time to replace the string trimmer line (8), the bobbin (3), including the string trimmer line (8), may be easily removed in its entirety from the supporting case (2) with the drive shaft (905) disconnected from the rotator (1), thus making the string trimmer line (8) easily replaceable.

A first implementation of a bobbin (3) is removably mounted onto a supporting case (2) that rotates along with a drive shaft (905) of a brush cutter body (90). The bobbin (3) includes: a bobbin body (30) having a cylindrical shape; an inner peripheral surface (3A) of the bobbin body (30); and an outer peripheral surface (3B) of the bobbin body (30). The inner peripheral surface (3A) is provided to be removably abutted onto the supporting case (2). The outer peripheral surface (3B) faces an opposite direction from the inner peripheral surface (3A) and is provided to have a string trimmer line (8) with flexibility wound thereon.

The bobbin (3) according to the first implementation enables making the string trimmer line (8) wound around the bobbin (3) usable for a long term. In addition, when it is time to replace the string trimmer line (8), the bobbin (3), including the string trimmer line (8), may be easily removed in its entirety from the supporting case (2), thus making the string trimmer line (8) easily replaceable.

A second implementation of the bobbin (3) has not only the configuration of the bobbin (3) according to the first implementation but also the following configuration as well. In the second implementation of the bobbin (3), the bobbin body (30) further includes a plurality of elastic members (33) configured to, in a state where the bobbin (3) is mounted onto the supporting case (2), be pressed and make elastic contact with the supporting case (2).

The bobbin (3) according to the second implementation allows the bobbin (3) to be held stably with respect to the supporting case (2) with the elastic holding force applied by the plurality of elastic members (33). This may reduce the chances of the bobbin (3) falling off accidentally from the supporting case (2). In addition, this also makes it easier to remove the bobbin (3) from the supporting case (2).

The invention claimed is:

1. A rotator comprising:
a supporting case coupled to a drive shaft of a brush cutter body and configured to rotate along with the drive shaft; and
a bobbin removably mounted onto the supporting case and configured to rotate along with the drive shaft and the supporting case,
when viewed in an upright position,
the supporting case including:
a cylindrical portion, inside of which the drive shaft is inserted to pass therethrough;
a flange portion extended radially outward from a lower part of the cylindrical portion; and
a plurality of extension holes provided through the flange portion,
the bobbin having:
an inner peripheral surface configured to be abutted onto an outer peripheral surface of the cylindrical portion; and
an outer peripheral surface which faces an opposite direction from the inner peripheral surface and around which a string trimmer line with flexibility is wound, and
the bobbin being configured to allow both end portions of the string trimmer line wound around the outer peripheral surface of the bobbin to be extended radially outward through respective extension holes selected from the plurality of extension holes,
the bobbin further including at least one elastic member configured to be pressed and make elastic contact with the outer peripheral surface of the cylindrical portion, the elastic member constituting a part of the inner peripheral surface of the bobbin.

2. The rotator of claim 1, wherein
the bobbin further has a groove located radially outward of the at least one elastic member and configured to allow the at least one elastic member to be flexed radially outward.

3. The rotator of claim 1, wherein
the at least one elastic member of the bobbin includes a plurality of elastic members arranged at intervals along a circumference of the inner peripheral surface of the bobbin.

4. The rotator of claim 3, wherein
the bobbin further has a plurality of grooves located radially outward of the plurality of elastic members and configured to allow the plurality of elastic members to be respectively flexed radially outward.

5. The rotator of claim 3, wherein
the inner peripheral surface of the bobbin has a plurality of guide portions which are raised to guide the bobbin when the bobbin is going to be mounted onto the cylindrical portion, and the plurality of elastic members and the plurality of guide portions are alternately arranged along the circumference of the outer peripheral surface of the bobbin.

6. The rotator of claim 1, wherein
the inner peripheral surface of the bobbin has a plurality of guide portions which are raised to guide the bobbin when the bobbin is going to be mounted onto the cylindrical portion.

7. The rotator of claim 1, wherein
the cylindrical portion and the flange portion of the supporting case are both made of a synthetic resin,
the supporting case further includes a metal fitting to be coupled to an upper part of the cylindrical portion, and
the metal fitting has an insert hole, into which the drive shaft is inserted to pass therethrough.

8. A brush cutter comprising:
the rotator of claim 1; and
the brush cutter body having the drive shaft, to which the rotator is coupled.

9. A rotator comprising:
a supporting case coupled to a drive shaft of a brush cutter body and configured to rotate along with the drive shaft; and
a bobbin removably mounted onto the supporting case and configured to rotate along with the drive shaft and the supporting case,
when viewed in an upright position,
the supporting case including:
a cylindrical portion, inside of which the drive shaft is inserted to pass therethrough;
a flange portion extended radially outward from a lower part of the cylindrical portion; and
a plurality of extension holes provided through the flange portion,
the bobbin having:
an inner peripheral surface configured to be abutted onto an outer peripheral surface of the cylindrical portion; and
an outer peripheral surface which faces an opposite direction from the inner peripheral surface and around which a string trimmer line with flexibility is wound,
the bobbin being configured to allow both end portions of the string trimmer line wound around the outer peripheral surface of the bobbin to be extended radially outward through respective extension holes selected from the plurality of extension holes, and
the bobbin further including:
a bobbin body having a cylindrical shape and having the inner peripheral surface and the outer peripheral surface;
a plurality of upper projections extended radially outward from an upper part of the outer peripheral surface of the bobbin body; and
a plurality of lower projections extended radially outward from a lower part of the outer peripheral surface of the bobbin body.

10. The rotator of claim 9, wherein
the plurality of upper projections and the plurality of lower projections are alternately arranged along the circumference of the outer peripheral surface of the bobbin when viewed along an axis at which the bobbin rotates around.

11. The rotator of claim 9, wherein
the cylindrical portion and the flange portion of the supporting case are both made of a synthetic resin,
the supporting case further includes a metal fitting to be coupled to an upper part of the cylindrical portion, and
the metal fitting has an insert hole, into which the drive shaft is inserted to pass therethrough.

12. A brush cutter comprising:
the rotator of claim 9; and
the brush cutter body having the drive shaft, to which the rotator is coupled.

13. A rotator comprising:
a supporting case coupled to a drive shaft of a brush cutter body and configured to rotate along with the drive shaft; and
a bobbin removably mounted onto the supporting case and configured to rotate along with the drive shaft and the supporting case,
when viewed in an upright position,
the supporting case including:
a cylindrical portion, inside of which the drive shaft is inserted to pass therethrough;
a flange portion extended radially outward from a lower part of the cylindrical portion; and
a plurality of extension holes provided through the flange portion,
the bobbin having:
an inner peripheral surface configured to be abutted onto an outer peripheral surface of the cylindrical portion; and
an outer peripheral surface which faces an opposite direction from the inner peripheral surface and around which a string trimmer line with flexibility is wound, and
the bobbin being configured to allow both end portions of the string trimmer line wound around the outer peripheral surface of the bobbin to be extended radially outward through respective extension holes selected from the plurality of extension holes,
the bobbin further including:
a bobbin body having a cylindrical shape and having the inner peripheral surface and the outer peripheral surface; and
a plurality of upper projections extended radially outward from an upper part of the outer peripheral surface of the bobbin body and
at least two upper projections selected from the plurality of upper projections are each being provided with a hook groove configured to hook an end portion of the string trimmer line.

14. The rotator of claim 13, wherein
the cylindrical portion and the flange portion of the supporting case are both made of a synthetic resin,
the supporting case further includes a metal fitting to be coupled to an upper part of the cylindrical portion, and
the metal fitting has an insert hole, into which the drive shaft is inserted to pass therethrough.

15. A brush cutter comprising:
the rotator of claim 13; and
the brush cutter body having the drive shaft, to which the rotator is coupled.

* * * * *